May 22, 1928.  
A. E. SPINASSE  
1,670,910  
APPARATUS FOR AND METHOD OF DRAWING GLASS  
Filed Aug. 1, 1921
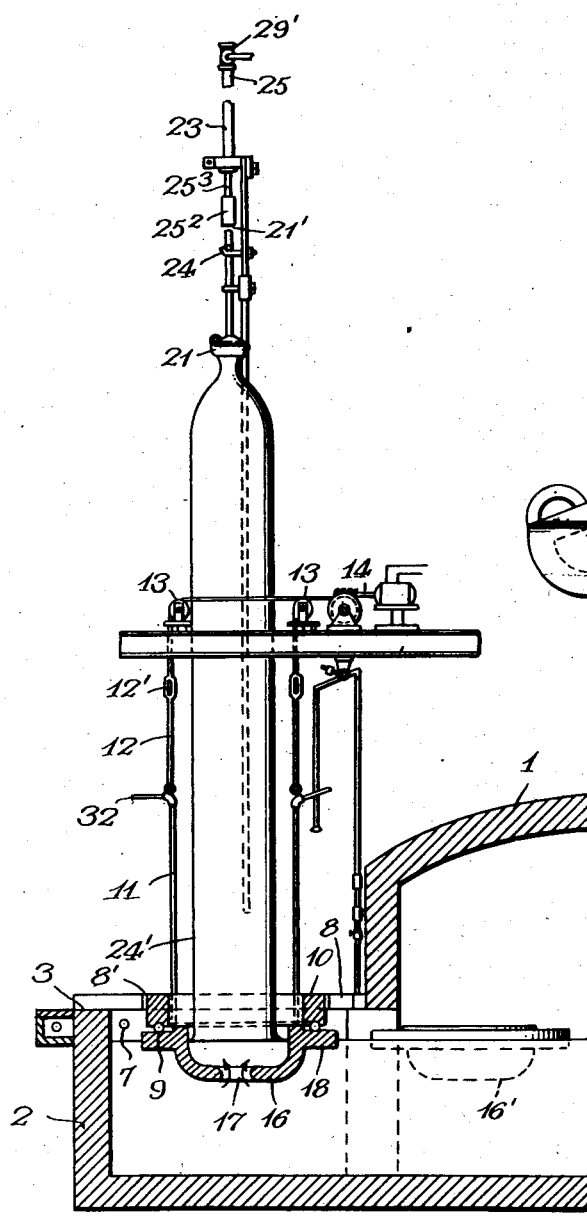
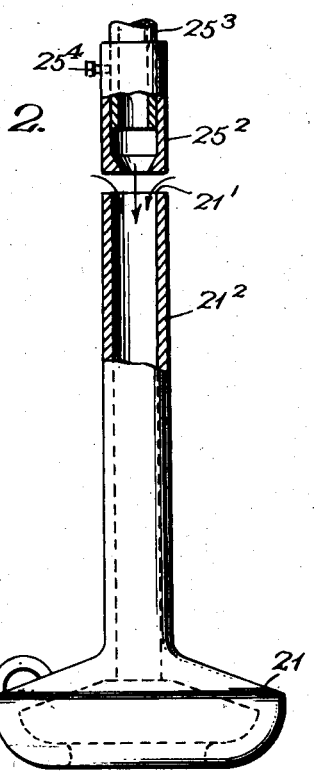
Inventor  
Arthur E. Spinasse  
By Sturtevant & Mason  
attys.

Patented May 22, 1928.

1,670,910

UNITED STATES PATENT OFFICE.

ARTHUR E. SPINASSE, OF MOUNT VERNON, OHIO.

APPARATUS FOR AND METHOD OF DRAWING GLASS.

Application filed August 1, 1921. Serial No. 488,807.

The invention relates to new and useful improvements in apparatus for and method of drawing glass articles, such as sheets or cylinders, from a mass of molten glass, whereby glass articles may be drawn with straight and uniform thickness of wall, homogeneous in texture, of clear quality and at increased drawing speed.

Fig. 1 is a side view partly in section, showing my device in some detail.

Fig. 2 is an enlarged view of the drawing means or form of bait which I prefer to use when intermittent drawing is being carried on.

In Fig. 1, 1 designates the melting tank, 2 a relatively small drawing station or forehearth having its rear portion in free communication with the glass in said tank, 3 the front wall of the melting tank. Burner 7 may be used for heating the front part of the station. Cover 8 is provided above the drawing station as shown and is provided with a drawing opening 8' into which freely passes a shield 10 which is suspended for vertical or horizontal movements by means of pipe supports 11, cable 12, laterally adjustable wheel members 13, and suitably controlled motor on drum 14. The shield 10 which may be made of refractory material, of preference has a water cooled hollow metal support 9 which is horizontally disposed beneath said shield and branched out to vertical supply pipes 11 which may be four in number and having flexible conduits 32 for supplying cooling fluid therein while permitting movement of the shield. The shield as shown is adapted to releasably engage the upper part of a float pot 16 when in drawing position. In top plan view the drawing station is a little larger than the diameter of said pot to allow free movements of the latter. These pots may be in any numbers, preferably two of them for each drawing station so that after drawing, the pot with its contained glass may be floated within the furnace subjected to the intense heat as pot 16' to remelt the glass therein, while the other pot containing clear glass may now be floated from within the furnace to the drawing station. These pots have a restricted vertical glass feeding bottom aperture 17 for commingling the glass as it passes within the pot for drawing, and may be provided with gravity flange 18 to maintain the apertured bottom of the pot suitably immersed below the surface of the mass of molten glass, thus causing glass to well up therein. However the shield member in engaging the pot may be lowered so as to further depress the pot in the glass thus causing more glass to well up through the restricted aperture when more glass is desired within said pot for drawing.

The shield may also be raised or lowered wholly or locally by means of turn-buckles 12' on cables 12, which may be four in number, whereby desired centered or lowered position of the shield and pot may be obtained for drawing. If desired, after drawing, the glass in the pot may be remelted while at the drawing station by placing a suitable lid over opening 8' when the shield 10 is withdrawn from the tank through opening 8'. Reheating may not be necessary however and the pot may be maintained any desired length of time in the drawing station, and may be elongated or circular in form depending as to whether a sheet or cylinder of glass is to be drawn.

The commingled portion of glass in the pot is drawn by means of a bait 21, carriage, cable or flexible pipe 23, which is lowered or raised by means of a suitable motor operated drum (not shown). Other suitable means may be provided for drawing sheet glass. The bait 21 is supported upon the carriage at 24 and, as shown in Fig. 2, with its open top pipe handle 21' directly beneath hollow stem $25^3$ of pipe 25, provided with a sleeve collar $25^2$ which may screw, but preferably freely slides on said stem as desired, with its opening below preferably smaller than the top opening 21' of the bait handle. A screw $25^4$ holds the sleeve in any desired position, or projects into a vertical slit, not shown but provided in said stem covered by the sleeve to retain a determined range of vertical loose motion to or from the bait. For operative drawing position the sleeve may be in loose contact with the top of the bait, but as shown is preferably held in suitable position spaced above the pipe to direct an open current of air within the bait and nascent cylinder.

As clearly shown, the bait which of preference is a circular non-adherent to glass bait having an interior ledge ending in a bottom opening is much smaller in cross section than that of the cylinder 24' drawn. The elongated tube handle 21² connected to the bait or leading to the cylinder of preference is straight and centrally located though not limited thereto, and as shown of restricted diameter to compare to that of the bait.

The end opening 21' of the tube 21² which if remote from the bait is of preference entirely open to the free atmosphere and forms an air inlet. The discharge end or jet of pipe 25² is also smaller in diameter than the tube and as shown it is arranged in spaced relation to discharge a stream or air current in the top opening 21' drawing with it air from the atmosphere into the tube 21² and hence into the article being drawn when in hollow form. I do not wish to be limited to this form but other modifications permitting air from the free atmosphere to be drawn by the fluid pressure jet into the bait tube and cylinder drawn may be used. It will be clear also that no auxiliary vent opening or openings are provided for the escape of the air from within the cylinder or bait during drawing.

I prefer to provide a hand controlled valve 29' within the reach of the operator in the air supply pipe 25 for the intermittent control of the air jet which as explained may take in air from the atmosphere as it passes into the pipe handle 21² for blowing and distending the glass being drawn thereby producing an article with perfectly straight walls. The incoming column of air in the tube, its dimension, and arrangement of the jet assist in preventing the air from escaping from within the hollow article being drawn. Naturally the air pressure is controlled to obtain the desired result. The attendant, in accordance with his observation, will adjust sleeve collar 25² to thereby shut off, or regulate the amount of the air drawn in from the atmosphere, and will manipulate the valve 29' to either increase or decrease the force of the air pressure jet. By adjustment of said sleeve and regulation of the air jet the expanding and forming of the drawn glass is obtained, preferably by the combined action of the air drawn from the atmosphere and the current of air pressure from the jet. The dimension, form and location of the discharging jet as well as the receiving conduit for the air may be greatly varied without departing from the spirit of this invention.

This application is a continuation in part of my pending application Serial No. 87,936 filed March 31, 1916, patented August 2, 1921, No. 1,386,441 and for further details reference may be made to said application.

Having thus described the invention, what I claim as new and desire to secure by Letters-Patent, is:—

1. Means for drawing hollow glass articles comprising a hollow bait having a cross dimension relatively smaller than that of the hollow article to be drawn, of a tube providing an elongated passage extending from the bait and having its end opening which is remote from the bait open to the free atmosphere, the cross dimension of the tube interior and opening being relatively smaller than the diameter of the bait, of a fluid pressure member having its discharging opening relatively smaller in cross section than that of said tube or opening, and being arranged to discharge fluid pressure in the tube opening and through said elongated tube whereby to expand and form the hollow article drawn by said bait.

2. A relatively small bait for drawing hollow glass articles, said bait having an extended tube connected therewith with its end opening which is remote from the bait open to the free atmosphere, of a jet pipe or conduit smaller in cross section than that of said pipe or opening and arranged to discharge fluid pressure into said opening and tube to expand the drawn article, together with means for varying the space between said jet and opening.

3. A relatively small bait for drawing hollow glass articles, said bait having an extended air supplying tube or conduit with a laterally extending opening leading to the open atmosphere at a point remote from the bait, of an air pressure supplying pipe having an outlet smaller in cross section than that of the inside diameter of said tube or conduit leading to the bait and arranged to discharge a jet of air across said opening into said tube or conduit to expand and form the hollow article drawn by said bait.

4. In combination, a bait for drawing hollow glass articles, said bait having a diameter relatively smaller than that of the article to be drawn, of an elongated conduit leading to the interior of the drawn article having a diameter relatively smaller than that of the bait and having its air intake opening remote from the bait and open to the free atmosphere, of an air pressure supplying pipe or jet member having its discharging end smaller in cross section than the interior diameter of said conduit leading to the drawn article and arranged to discharge a jet of air into said conduit or opening for distending the glass drawn by said bait.

5. In combination, a bait for drawing hollow glass articles from molten glass, said bait having a diameter relatively smaller than that of the article to be drawn, of a conduit forming a passage leading to the interior of the drawn article having a diameter relatively smaller than that of the bait and having its air intake opening remote from the bait and open to the atmosphere, of an air pressure supplying jet or pipe means having its discharging end smaller in cross section than the interior diameter of said conduit leading to the drawn article and arranged to discharge a jet of air pressure into said conduit, whereby air from the atmosphere may be drawn by said jet of air pressure into said conduit and article being drawn for distending and maintaining the distended form of said article, and means for controlling the air drawn from the atmosphere by said air pressure jet or pipe.

6. A bait for drawing hollow glass objects from molten glass comprising a head, a pipe fixed thereto and forming an elongated passage extending to the interior of the bait, an air jet pipe spaced from the outer end of said pipe and of smaller inner diameter than the diameter of the passage in said pipe, and means carried by the air jet pipe for closing or partially closing the space between the air jet pipe and the pipe connected with the bait.

7. The method of forming hollow glass articles by air pressure, which includes the steps of forcing a jet of air of restricted cross-sectional area into an open-ended passage leading to the hollow glass article being formed and which passage is slightly larger in cross-sectional area than, said jet, and causing air from the atmosphere to be drawn by said jet of air into said passage and article for distending and maintaining the distended form of said article.

8. The method of forming hollow glass article by air pressure, which includes the steps of forcing a jet of air pressure of restricted cross-sectional area into an open-ended passage leading to the hollow glass article being formed and which passage is smaller in cross section than the diameter of the article being formed and slightly larger than said air pressure jet, in causing air from the free atmosphere to be drawn by said jet of air pressure into said passage and article being formed, regulating the efficiency of the jet and distending and maintaining the distended form of the article by the combined action of the air thus drawn from the atmosphere and air pressure from said jet.

9. In apparatus for drawing glass articles from a bath of molten glass, a device for drawing the glass of the bath in hollow form, blowing means for the drawn glass comprising a conduit providing a restricted air passage to the hollow drawn article, said conduit having an opening to the atmosphere, and a jet member disposed so as to supply a jet of air into the air passage of said conduit.

10. In apparatus for drawing glass cylinders from a bath of molten glass, a conduit providing a restricted air passage to the cylinder being drawn and having an opening to the atmosphere, and an air supplying jet arranged to discharge through said conduit, the discharging end of the air supplying jet being disposed in air injector relation to the opening of said conduit to the atmosphere.

11. A bait for drawing hollow glass objects from a bath of molten glass, said bait being hollow and having a pipe relatively small in cross section, and means for directing a jet of air through said pipe, said air jet means being of such size relative to the pipe and so disposed thereto as to provide a passage between the interior of the pipe and the free atmosphere.

12. In apparatus for drawing hollow glass articles from a bath of molten glass, a device for drawing the article from said bath, means providing a restricted air passage to the hollow drawn article and having an opening to the free atmosphere, jet means of less cross sectional area than that of said passage, said jet means being disposed in close proximity to said opening to direct air under pressure through said restricted air passage and thence within the hollow article being drawn by said device.

13. In apparatus for drawing glass cylinders from a bath of molten glass, a hollow bait having a bottom opening and an internal novel supporting ledge, a relatively long enclosed conduit leading to the bait and providing a passage of less cross sectional area than said opening, said conduit having an opening to the free atmosphere, and an air pressure jet means having a discharge opening of less cross sectional area than said passage and disposed so as to supply a jet of air into said passage.

14. In the art of blowing hollow articles being drawn from a bath of molten glass, the method which consists in drawing air from the atmosphere into the drawn article by forcing a jet of air into a slightly larger passage having an opening to the free atmosphere, and conducting the air pressure received within said passage from said jet and atmosphere into the hollow glass article being drawn.

15. In the art of blowing hollow glass articles being drawn from a bath of molten glass, the steps which consist in forcing a jet of air into a restricted enclosed air passage having an opening to the free atmosphere, and leading the air received within said air passage into the hollow drawn article.

16. In the art of blowing hollow glass articles being drawn from a bath of molten glass, the method of which consists in directing a jet of air in open relation to the atmosphere into a passage slightly larger than the jet and considerably smaller in cross sectional area than the hollow drawn article, and leading the air received into said passage from said jet within the hollow drawn article.

17. In the art of blowing hollow glass cylinders or like articles from a bath of molten glass, the method which consists in forcing a jet of air into a relatively long enclosed passage leading to the cylinder, which enclosed passage is larger in cross sectional area than the jet opening but smaller than the cross sectional area of the article being drawn.

In testimony whereof I affix my signature.

ARTHUR E. SPINASSE.